United States Patent [19]
Nehring

[11] Patent Number: 5,808,441
[45] Date of Patent: Sep. 15, 1998

[54] MICROPROCESSOR BASED MOTOR CONTROL SYSTEM WITH PHASE DIFFERENCE DETECTION

[75] Inventor: Daniel A. Nehring, Ann Arbor, Mich.

[73] Assignee: Tecumseh Products Company, Tecumseh, Mich.

[21] Appl. No.: 661,139

[22] Filed: Jun. 10, 1996

[51] Int. Cl.⁶ ........................................ H02P 1/44
[52] U.S. Cl. ............................ 318/751; 318/781; 361/33
[58] Field of Search ........................... 318/438, 751–752, 318/785–794; 361/23, 21, 33, 88

[56] References Cited

U.S. PATENT DOCUMENTS

| | | | |
|---|---|---|---|
| 3,746,951 | 7/1973 | Hohman | 318/786 |
| 3,786,326 | 1/1974 | Hubner . | |
| 4,317,176 | 2/1982 | Saar . | |
| 4,481,786 | 11/1984 | Bashark | 318/438 |
| 4,628,233 | 12/1986 | Bradus . | |
| 4,767,975 | 8/1988 | Unsworth . | |
| 4,843,295 | 6/1989 | Thompson et al. | 318/786 |
| 5,017,853 | 5/1991 | Chmiel | 318/786 |
| 5,151,638 | 9/1992 | Beckerman . | |
| 5,166,592 | 11/1992 | Bashark | 318/799 |
| 5,237,256 | 8/1993 | Bashark | 318/751 |
| 5,276,392 | 1/1994 | Beckerman | 318/751 |
| 5,280,227 | 1/1994 | Bashark | 318/751 |
| 5,296,795 | 3/1994 | Dropps | 318/778 |
| 5,302,885 | 4/1994 | Schwarz . | |
| 5,323,094 | 6/1994 | Kaneda . | |
| 5,343,127 | 8/1994 | Maiocchi . | |
| 5,463,874 | 11/1995 | Farr . | |

*Primary Examiner*—David S. Martin
*Attorney, Agent, or Firm*—Baker & Daniels

[57] ABSTRACT

The present invention involves a control system for a motor having a main winding and an auxiliary winding disposed on a stator. A microprocessor determines the phase difference between the line voltage and the voltage between the main winding and the auxiliary winding to determine the rotational status of the rotor. In a moving rotor, a measurable phase difference exists. This phase difference can be measured by monitoring the zero crossings of the respective voltages. One method of measuring the phase difference is to check the logic state corresponding to the voltage between the main and auxiliary windings when a predetermined time period has elapsed after a zero crossing of the line voltage. Another method measures the time delay between the zero crossings of the two voltages. The control system of the present invention is particularly adapted for use with single phase AC motors having a main winding and an auxiliary winding disposed electrically out of phase on the stator. The control system of the present invention is also particularly adapted for use with compressors and appliances associated with a refrigeration system having a cabinet temperature detector. The refrigeration system of the present invention includes a motor housing detector to deenergize and prevent motor start if an overheat condition exits, and a user setting device to allow a user to manually add an offset to the temperature setting. Additional control functions can be easily added using extra input and output leads provided on the microprocessor.

37 Claims, 10 Drawing Sheets

Running

PRIOR ART

FIG. 3A

Locked Rotor

PRIOR ART

FIG. 3B

PRIOR ART

MICROPROCESSOR BASED MOTOR CONTROL SYSTEM WITH PHASE DIFFERENCE DETECTION

BACKGROUND OF THE INVENTION

1. Field of the Invention

This invention relates to motor control systems and more particularly to a system for controlling power to an electric motor having main and auxiliary windings during motor start up and normal operations.

2. Related Art

Single phase induction motors usually comprise a cage type rotor and a set of windings, main and auxiliary, on the stator. This type of motor is widely used for low power range applications, including refrigeration compressors, washing machine motors, and pumps, due to their simple construction and reliability.

During motor operation, power applied to the main stator windings creates a magnetic field fixed in space and alternating in amplitude. This pulsating magnetic field will turn a rotor that is in motion. However, this stator flux cannot create starting torque to turn a stationary rotor, and thus a rotating magnetic field must be provided during motor start up.

One method of creating a rotating magnetic field in a single phase AC induction motor is to provide a main winding and an auxiliary winding on the stator whereby the currents of the main and auxiliary windings are out of phase. The auxiliary winding typically has a higher resistance to reactance ratio than the main winding to ensure that the two currents are out of phase. The combination of the out of phase currents resolve to produce a rotating stator field which provides starting torque. Once started, the motor will continue to run and the auxiliary winding can be de-energized.

It is desirable to minimize the time starting current is applied to the auxiliary winding. The auxiliary winding is usually much smaller in diameter than the main winding and prolonged energization of the auxiliary winding can stress, overheat and damage the auxiliary winding.

Thus, it is necessary to provide a device in series with the auxiliary winding circuit which temporarily connects the auxiliary winding to the power supply until the rotor has reached sufficient speed. If the rotor is sufficiently up to speed by a certain time period, the auxiliary winding may be de-energized, the main winding kept energized, and normal operation continued. However, if the rotor fails to reach sufficient speed or a locked rotor condition is detected, the motor windings must be de-energized since a locked rotor condition can overheat the coils and damage the motor. Additionally, a monitoring and control circuit is necessary to monitor the condition of the rotor and take protective action if a locked or overload condition is detected during normal operations. The control circuit can be configured to permit selective restarting of the motor if the motor is de-energized due to a locked or overloaded rotor condition.

Various methods exist for connecting and disconnecting the power source to the auxiliary winding during motor start up.

One method of connecting and disconnecting the auxiliary winding uses a relay circuit connected in series between the auxiliary winding and the power source to temporarily connect the power source to the auxiliary winding until a change in motor voltage or current causes the relay to disengage or until some specified time delay has expired. Such an arrangement has a number of disadvantages. First, a relay circuit based on time delay cannot determine whether the motor has started and cannot attempt a restart. Second, such an arrangement requires relays with different ratings for different motors, and the relays may be affected by fluctuations in line voltage. Third, relays are susceptible to mechanical wear, may be adversely affected by dust, chemicals and other environmental factors, and may not be used in certain hazardous environments due to possible arcing between the contacts. As such, use of a electromechanical relay is not practical in refrigeration systems, particularly refrigeration systems with isobutane refrigerant.

Another method of connecting and disconnecting power to an auxiliary winding uses a centrifugal switch which opens when the rotor achieves a certain percentage of full speed. Again, such an arrangement presents the disadvantages associated with variations caused by line voltage fluctuations. Also, the use of mechanical relays in compressor motor protector circuits may be physically problematic. For instance, under high temperature conditions the metallic contacts of the relay may melt down and permanently close due to excessive compressor temperatures. Furthermore, the physical contacts within the relay are subject to damage from repeated wear, corrosion, metal fatigue or other physically degrading conditions.

Yet another method of connecting and disconnecting power to an auxiliary winding places a positive temperature coefficient (PTC) resistor between the auxiliary winding and the power source. The resistance of a PTC resistor increases as the PTC resistor heats up. The low initial resistance permits current to flow to the auxiliary winding, but subsequent temperature build up and increasing resistance of the PTC resistor essentially cuts off current to the auxiliary winding. An arrangement using a PTC resistor has a number of disadvantages. First, a PTC resistor's characteristics change with heat and recovery time is required before a PTC resistor returns to its initial resistance. Second, since the a PTC resistor cannot be used to determine whether the motor has started successfully, such an arrangement requires additional overload protection and restart control. Third, PTC resistors have a slow response time which can be problematic because any prolonged application of high starting current to the auxiliary winding can stress and shorten the life of the auxiliary winding.

Finally, another method utilizes the phase angle relationship between the motor voltage and current to control a device placed in series between the power source and the auxiliary winding. Under ideal no load conditions, the current lags the voltage by 90 degrees, but as the load on the motor increases, the phase angle difference between the voltage and the current approaches zero. The phase angle relationship can be derived by measuring the time difference between the zero crossings of the voltage and the current. A current zero crossing detector and a voltage zero crossing detector can be used to provide a pulse when the current or the voltage passes zero. A microprocessor can be used to determine the time difference between the two pulses and thereby determine the phase difference between the voltage and the current. The microprocessor uses the phase difference to determine the movement status of the rotor and deenergize the motor if a locked rotor or an overload condition exists.

An alternative means of controlling the power to a motor is to continually adjust the firing angle of the solid state switches that connect the line voltage to the motor windings, rather than merely operate a switch connected in series between the power source and the auxiliary winding. The phase angle difference between the voltage and current can be monitored to selectively provide firing signals to the solid state switches depending on the motor load. A problem associated with the above described systems is that they require expensive current transformers and/or precision resistors.

In view of the above, what is needed is an economical and reliable means of monitoring and controlling a motor having a main winding and an auxiliary winding during starting and normal operations.

What is also needed is a microprocessor based control circuit to monitor and control a motor having a main winding and an auxiliary winding.

What is specifically needed is a microprocessor based control system which utilizes simple and reliable solid state devices to monitor and control a single phase AC induction motor. The use of a microprocessor based solid state control system permits simple incorporation of additional control and monitoring features for a particular application.

SUMMARY OF THE INVENTION

This invention provides a microprocessor based monitoring and controlling circuit which controls the starting and normal operation of a motor using the phase relationship between the line voltage and the voltage between the main winding and the auxiliary windings. This invention is particularly suited for monitoring and controlling a single phase AC induction motor in a compressor or an appliance in a refrigeration system.

The control circuit may be further provided with temperature sensors to automatically start and stop the compressor in order to keep a refrigeration system within a predetermined temperature band. The control circuit may be further provided with a user control so that the operator can manually adjust the temperature band of the refrigeration system. The control circuit also provides for additional inputs to the microprocessor so that other control functions may be added later.

The present invention comprises a succinct circuit which uses reliable solid state switches to implement the control functions. The present invention uses a microprocessor which receives voltage inputs and controls solid state switches to supply power to the motor windings. The use of zero-crossing detection to sense phase relationships rather than voltage or current levels obviates the need for current transformers and precision resistors. Also, the use of solid state switches to control power to the motor windings obviates the need for less reliable mechanical switches and relays. Microprocessor control is also advantageous because adding additional control features is simply a matter of modifying the programming and adding the necessary control components to the control circuit.

When the rotor of a single phase AC motor is in motion, there is a measurable delay between the line voltage and the voltage between the main and auxiliary windings. As the loading on the motor increases, that phase difference decreases. When the rotor is not in motion, the phase difference is nearly zero. The control circuit uses this phase difference during starting operations and shutdown to detect a locked rotor condition.

When the motor is started, the microprocessor based controller activates a set of solid state switches to initiate the start sequence and provide power to the motor. Power is applied to both the main and auxiliary windings to start the rotation of the rotor. After a predetermined time interval, the microprocessor checks the phase difference between the line voltage and the voltage between the main and auxiliary windings. The phase difference is measured by monitoring the zero crossings of the respective voltages. Thus, the phase angle difference between the line voltage and the voltage between the main and auxiliary windings is conveniently measured with minimal interfacing. If the phase relationship indicates that the rotor has reached sufficient rotational speed, the controller de-energizes the auxiliary winding and continues with normal operations. If the phase relationship indicates that the rotor is not up to sufficient rotational speed, the controller de-energizes both the main and auxiliary windings and waits for a predetermined time interval before attempting another start sequence.

In one embodiment, the controller determines the phase difference by waiting a preprogrammed time period after the zero crossing of the line voltage then checking the logic state corresponding to the voltage between the main and auxiliary windings. If the voltage between the main and auxiliary windings exceeds a predetermined level, the input provides a logic state which indicates that the phase difference is small and the rotor is locked or not up to sufficient speed. If the voltage between the main and auxiliary winding is below a predetermined level, the input provides a logic state which indicates that a measurable phase difference exists and the rotor has started normally.

In another embodiment, the controller determines the phase difference by measuring the time delay between the line voltage and the voltage between the main and auxiliary windings. A time count is initiated when the microprocessor detects the zero crossing of the line voltage. The microprocessor then counts the time interval until the zero crossing of the voltage between the main and auxiliary windings is detected. The microprocessor uses the measured time delay to determine the phase relationship between the voltages.

Therefore, it is an object of this invention to provide an economical and reliable means of monitoring and controlling a motor having a main winding and an auxiliary winding during starting and during normal operations.

It is a more specific objective of this invention to provide a microprocessor based controlled means of monitoring and controlling a single phase AC induction motor during starting and during normal operations, such that various discrete devices can be replaced with a simple circuit based on solid state components.

It is a further objective of this invention to provide a starting device that can be used in place of electromechanical relays typically used on inductive motors, and replace PTC devices typically found on capacitive run motors.

It is a further objective of this invention to provide a starting device that can determine whether a start sequence was successful after a short interval and if not, to extend the start sequence interval.

It is a further objective of this invention to provide a starting device that can determine whether a start sequence was successful and if not, to wait a fixed time before attempting a restart.

It is a further objective of this invention to provide a starting device that does not require calibration for different motors, is not dependent on minor line voltage variations, and will not attempt a motor start when the line voltage is too low.

It is a further objective of this invention to provide a starting device having a simple interface to the motor for sensing the rotor state.

It is a further objective of this invention to provide a means of monitoring and controlling a single phase AC induction motor used in a compressors and appliances, particularly compressors and appliances in refrigeration systems which are cycled to maintain a predetermined system temperature range.

BRIEF DESCRIPTION OF THE DRAWINGS

The above mentioned and other features and objects of this invention, and the manner of attaining them, will become more apparent and the invention itself will be better understood by reference to the following description of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE EXEMPLARY EMBODIMENT

The embodiments disclosed below are not intended to be exhaustive or limit the invention to the precise forms disclosed in the following detailed description. Rather, the embodiments are chosen and described so that others skilled in the art may utilize their teachings.

This invention relates to a microprocessor controlled starting and control of motors having a main winding and an auxiliary winding. The invention is especially applicable to single phase AC inductions motors which comprise a stator having a main winding and an auxiliary winding disposed electrically out of phase, and a rotor which is usually of a squirrel cage construction.

To start the motor, a line voltage is applied to both the main winding and the auxiliary winding. Since the main and auxiliary windings are placed electrically out of phase, application of AC voltage to the main and auxiliary windings creates a rotating magnetic field in the motor, rotating around the rotor. The rotating magnetic field induces a current in the rotor, which induces a rotating force on the rotor. This force is usually sufficient to start the rotation of the induction motor, but in some cases the rotor may fail to rotate. Thus, a monitoring and control circuit must be provided to determine whether the rotor has started properly and de-energize the motor if the rotor failed to come up to sufficient speed.

The movement of the rotor may be detected by comparing the phase lag between the line voltage and the voltage between the main winding and the auxiliary winding. When the rotor is not moving, the phase difference is nearly zero. When the rotor is moving, there is a measurable delay in the phases of the two voltages. A microprocessor can be programmed and arranged with the motor windings to detect this phase difference and to de-energize the motor if a faulty start or a locked rotor condition is detected.

The phase and magnitude relationships between voltages occurring in the motor are illustrated in Table 1 with data taken from computer simulation and from measurements of an actual motor. In Table 1, Vrc equals the line voltage, Vsc equals the voltage across the auxiliary winding, and Vrs equals the voltage between the main and auxiliary windings.

TABLE 1

|  | Simulated | Measured |
|---|---|---|
| Locked |  |  |
| Vrc | 115.0 | 106.0 |
| Vsc | 8.6 | 5.0 |
| Vrs | 121.2 | 110.0 |
| Running |  |  |
| Vrc | 115.0 | 116.0 |
| Vsc | 99.7 | 96.0 |
| Vrs | 146.3 | 135.0 |

Figure 3A:
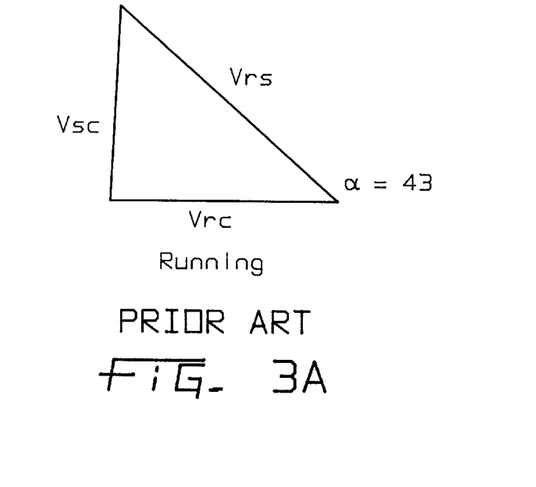
FIGS. 3a and 3b are vector diagrams illustrating the relationship between Vsc and Vrc of a conventional motor having a main and auxiliary winding when the rotor is turning and when the rotor is locked.
Figure 3B:
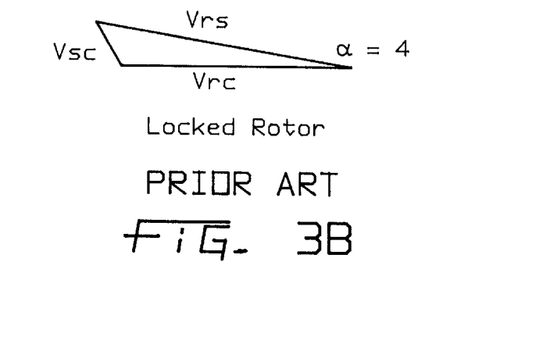

The voltages of Table 1 are represented with the vector diagrams of FIGS. 3a and 3b. Vsc is the back emf voltage of the auxiliary winding. Vsc has a significant magnitude when the rotor is turning as shown in FIG. 3a, but is practically zero when the rotor is locked as shown in FIG. 3b. As illustrated in FIGS. 3a and 3b, the change is magnitude of Vsc causes a large difference in the phase angle between Vrs and Vrc.

Figure 4:
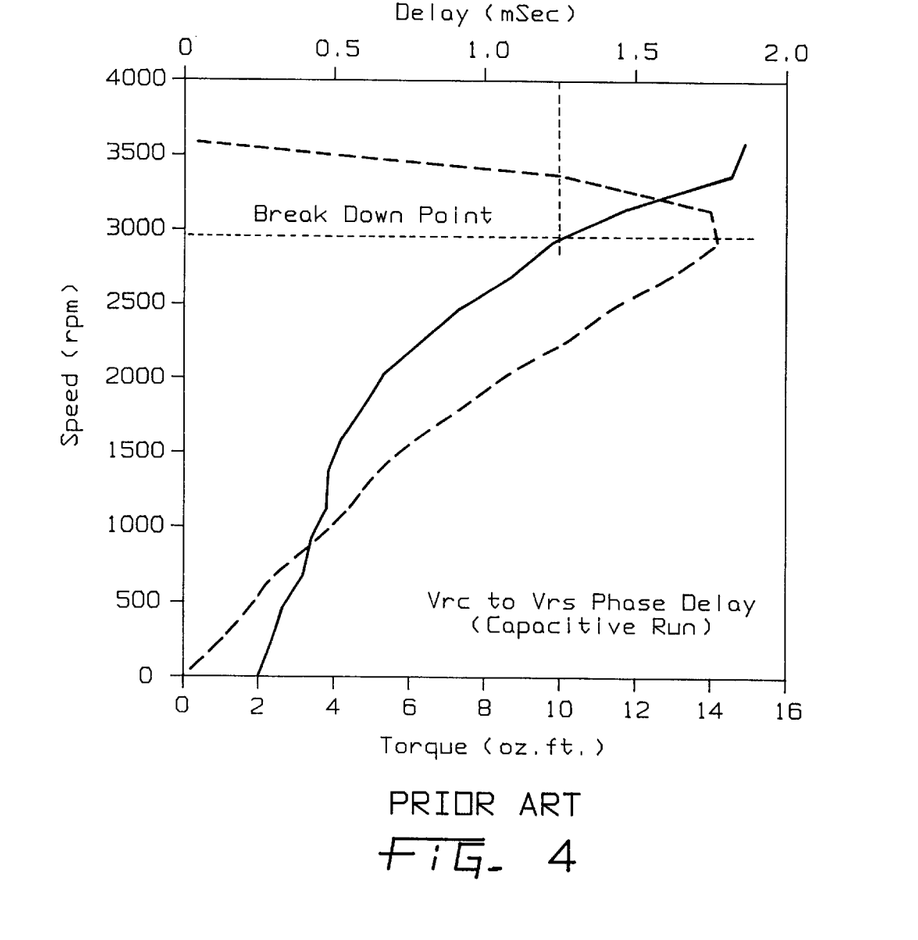
FIG. 4 is a graph of the speed-torque characteristic of a capacitive run motor (a conventional motor with a permanent capacitor in series with the auxiliary winding).
Figure 5:
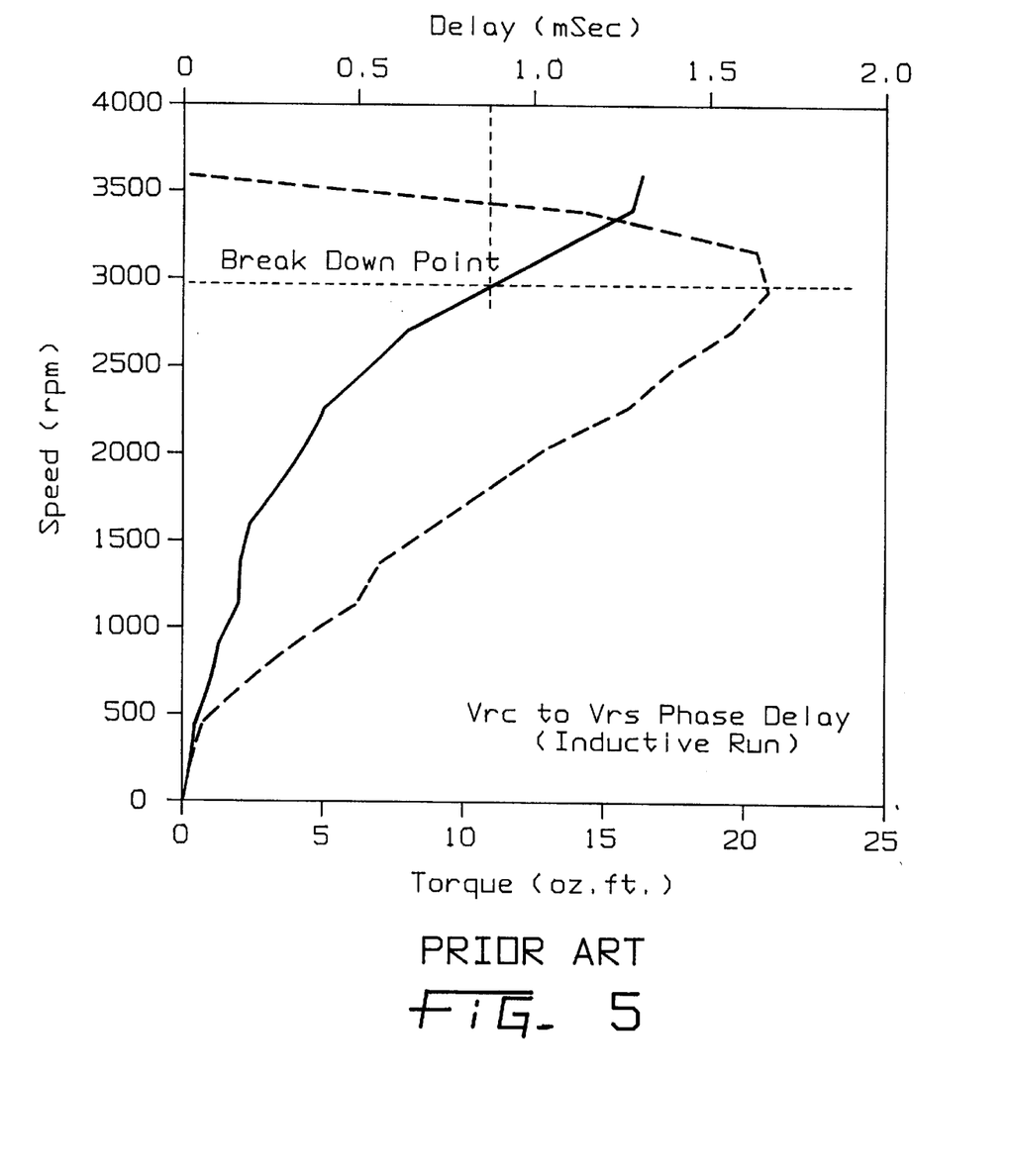
FIG. 5 is a graph of the speed-torque characteristic of an inductive run motor (a conventional motor without a permanent capacitor in series with the auxiliary winding).

FIGS. 4 and 5 illustrate how the phase angle changes with respect to the speed-torque characteristics of a capacitive run motor, which has a permanent capacitor in series with the auxiliary winding and an inductive run motor, which does not include a capacitor in series with the auxiliary winding. The solid lines indicate the delay between Vrc and Vrs as a function of motor speed, while the dashed lines indicate the torque as a function of motor speed.

The phase delay was calculated from the motor voltages with the law of cosines as follows:

$s=(Vsc+Vrs+Vrc)/2$ $r=sqrt\ (((s-Vsc)*(s-Vrs)*(s-Vrc))/s)$ $a=2*arctan\ (r/(s-Vsc))$ FIGS. 4 and 5 show that for both types of motors, a delay of 0.75 mSec or less will indicate that the rotor speed is below the breakdown speed. During a start interval, the motor must achieve greater than breakdown speed to sustain operation.

The phase difference between Vrc and Vrs can be conveniently measured with minimal interfacing using voltage detection circuits which detect zero crossings of the respective voltages. These voltage zero crossings can be used by a microprocessor to determine the phase angle difference and this difference proves to be definitive in identifying the state of the rotor. When locked, the angle is very close to zero. When running, the angle is about 45 degrees. In a 60 hz system, for instance, 45 degrees will produce a 2 millisecond delay between the zero crossings of the two voltages.

Figure 1:
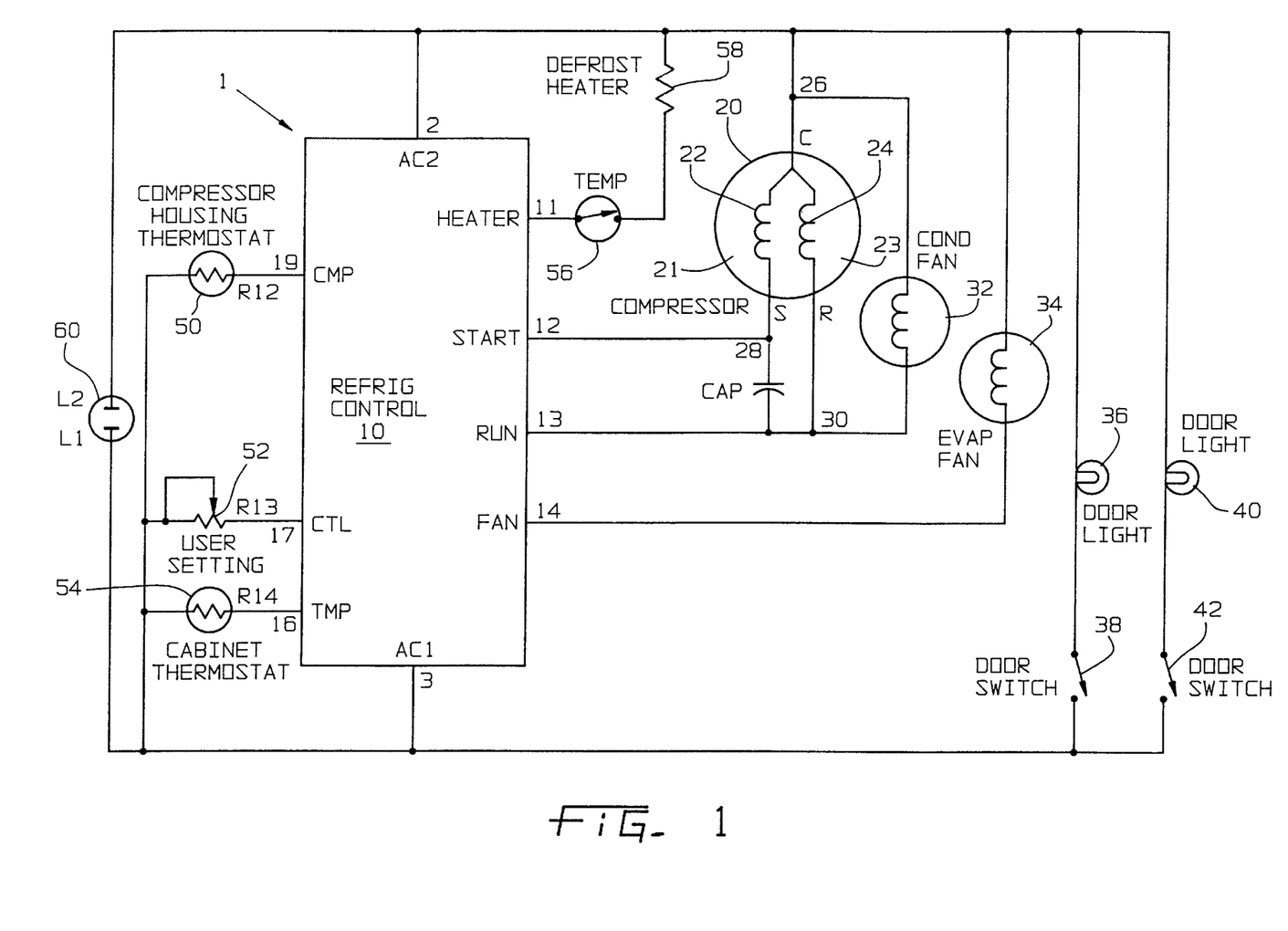
FIG. 1 is a simplified schematic diagram of an implementation of the present invention.

FIG. 1 shows a simplified schematic diagram of a control system of the present invention. Control system 1 comprises single phase AC induction motor 20 having a stator 23 and a rotor 21. Stator 23 has disposed on it main winding 24 and auxiliary winding 22 which are placed electrically out of phase with each other. Induction motor 20 is powered by commercially available 60 hertz source 60. Power to motor 20 is controlled by Controller 10 having input and output lines 2–3 and 11–19. Controller 10 is powered through input lines 2 and 3. A computer memory is included in Controller 10 to store instructions for operation which is described in greater detail below relating to the flow charts. Such computer memory may be magnetic memory, bubble memory, random access memory (RAM), read only memory (ROM), programmable read only memory (PROM), electronically programmable ROM (EPROM), erasable electronically programmable ROM (EEPROM), or other suitable devices. Controller 10 controls power to main winding 24 through output line 13 and connection point 30 and power to auxiliary winding 22 through output line 12 and connection point 28. The main auxiliary windings 24 and 22 are coupled by capacitor CAP. Main winding 24 and auxiliary winding 22 share a common connection to power source 60 at terminal 26.

The invention also includes a number of auxiliary features necessary to implement a refrigeration system. Condenser fan 32 and evaporator fan 34 are included in the system and controlled through output lines 13 and 14 respectively. Door lights 36 and 40, which are activated through door switches 38 and 42, respectively, are provided to illuminate the interior of the refrigeration system cabinet. Controller 10 automatically controls the temperature range of the refrigeration system by sensing the cabinet temperature using cabinet temperature sensor circuit 54 via input line 16. User adjust circuit 52 allows the operator to vary the temperature range of the refrigeration system and is sensed via input line 17. Compressor housing temperature sensor circuit 50 is sensed via input line 19 and allows controller 10 detect a high motor temperature condition in order to take protective action if a motor overheat condition exist. Finally, temperature sensor 56 and defrost heater 58 implement the defrost function which allows the refrigeration system to automatically clear frost blockages in the system.

Control system 1 operates by controller 10 starting motor 20 and monitoring its performance. To start induction motor 20, controller 10 energizes main winding 24 and auxiliary winding 22 of motor 20 through connections 30 and 28, respectively. Since main winding 24 and auxiliary winding 22 are placed electrically out of phase with each other a rotating magnetic force is created in the motor. This rotating magnetic force induces a current in rotor 21, which in turn induces a rotating force on rotor 21, causing rotor 21 to rotate. At the end of the start sequence, controller 10 de-energizes auxiliary winding 22 and checks the operating status of rotor 21 by sensing the phase difference between the line voltage from power source 60 and the voltage between main winding 24 and auxiliary winding 22.

During motor startup, if the phase difference is below a predetermined limit, controller 10 detects a locked rotor, de-energizes main winding 24 in order to completely de-energize motor 20 and waits for a preprogrammed time interval before attempting another start sequence. If the phase difference exceeds the predetermined limit, controller 10 detects a normal start and normal motor operations can continue. During normal motor operation, controller 10 monitors the condition of rotor 21 by running the rotor check subroutine shown in FIG. 8 (described in greater detail below) to check the phase difference between the two voltages, and de-energizes motor 20 when a locked rotor condition is detected.

Figure 2:
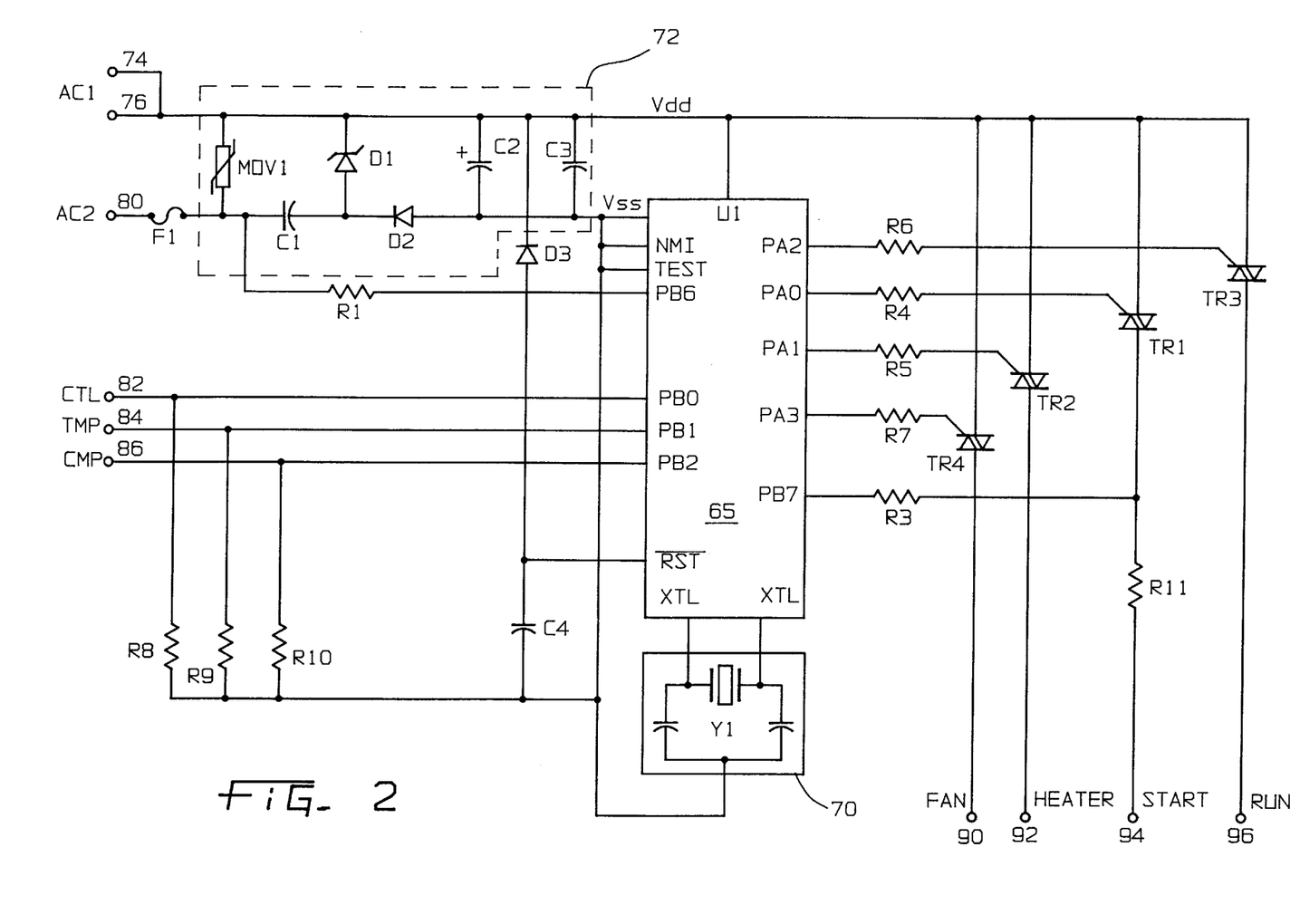
FIG. 2 is a schematic diagram of a control circuit of the present invention.

FIG. 2 shows a detailed schematic diagram of the control circuit illustrated in the schematic diagram of FIG. 1. Microprocessor 65, which with TRIACS TR1-4 is included in controller 10, is provided with a plurality of input/output lines to sense the condition of the system and send out various control signals. Input circuits provided as part of a refrigeration control circuit include user adjust mechanism circuit 52 connected to microprocessor 65 at input PB0 via terminal 82, cabinet temperature sensing circuit 54 connected at input PB1 via terminal 84, and compressor housing temperature sensing circuit 50 (see FIG. 1) connected at input PB2 via terminal 86. The output lines 90, 92, 94, and 96 generally correspond to output lines 14, 11, 12, and 13 of FIG. 1.

Microprocessor 65 is powered by DC power supply 72 which converts 115 volts AC to 5 volts DC referenced to a floating ground Vss. DC power supply 72 comprises capacitors C1, C2, C3, zener diode D1, and diode D2. AC voltage provided through terminals 74 and 80 is current limited by capacitor C1, clamped by diode D1 and rectified by diode D2. Capacitors C2 and C3 filter the rectified voltage. MOV1 limits AC transients and capacitor C3 filters the high frequency noise present in the DC output. Diode D3 and capacitor C4 provide a delayed reset to ensure proper initialization when power is supplied. Resonator 70 provides a stable clock for microprocessor 65 to coordinate control operations.

During the positive AC cycle, zener diode D1 is clamped, capacitor C2 is charged and current flows through the circuit, current limiting capacitor C1 and diode D2. During the negative AC cycle, D2 is reverse biased and the circuit is powered by the voltage stored in capacitor C2. Terminals 82, 84, and 86 are connected to inputs PB0, PB1 and PB2 of microprocessor 65, respectively. PB0, PB1, and PB2 are inputs to internal analog to digital converters of microprocessor 65. Each input is connected to voltage dividers across Vdd and Vss. Each input is a resistive device connected externally to Vdd via a resistor to Vss.

Zero crossings of the line voltage and the voltage between main winding 24 and auxiliary winding 22 are sensed at PB6 through current limiting resistor R1 and at PB7 through current limiting resistor R3, respectively. Internal protection diodes built into microprocessor 65 clamp the inputted voltages to one diode drop within Vdd and Vss.

Outputs PA0–3 are connected to the gates of Triacs TR1-4 through resistors R4–7, respectively, to control the operation of Triacs TR1-4. When an output goes to a low state, it provides a sink for the associated Triac gate current thereby causing the associated Triac to turn ON.

Current limiting resistor R11 is optionally included depending on the requirements of the motor.

FIGS. 6–17 show flow diagrams for the program used by microprocessor 65 in a control system of the present invention. The program is especially adapted to be used in a refrigeration system comprising a controller, a compressor motor, a thermostat disposed on the compressor housing, a chamber to be cooled, a thermostat disposed within the chamber, a user setting device for manually setting the desired temperature range, and an automatic defroster.

Figure 6:
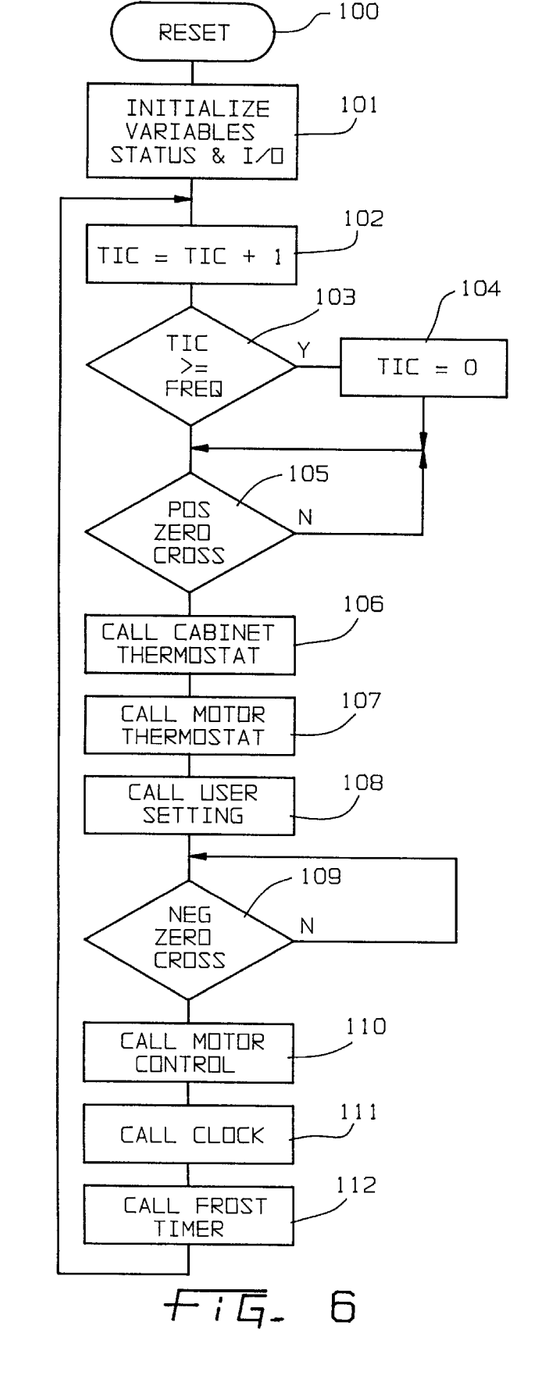
FIG. 6 is a flow chart of the main program sequence of the controller.
Figure 16:
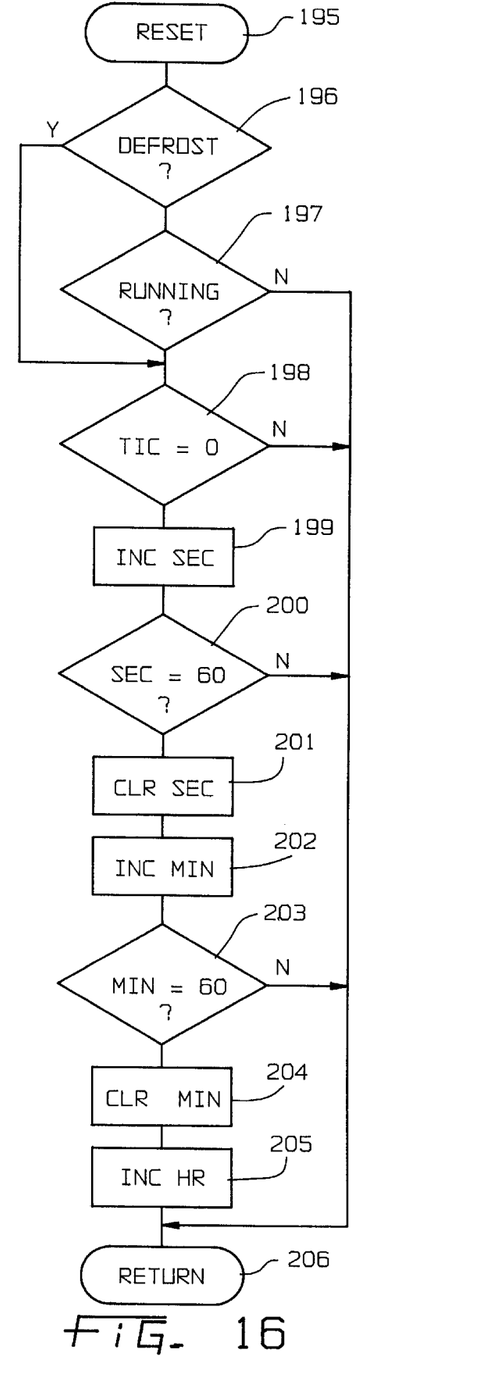
FIG. 16 is a flow chart of the clock subroutine.

FIG. 6 shows the main program sequence of controller 10 which comprises steps 100–112. Initially, all status variables are reset in steps 100–101. In step 102, the main program sequence increments the tic variable and compares the tic variable with AC line frequency. The tic variable is used to coordinate program operations and update the system clock used by the program to implement functions requiring a timer, such as the defrost function. The tic variable is reset to zero (step 104) when the tic variable value equals the line voltage frequency (which is a constant value) to indicate that 1 second has elapsed. The clock is incremented by one second in the clock subroutine, when the tic variable is reset to zero, as shown in FIG. 16 (described in greater detail below). After checking the tic variable, the main program sequence waits for a positive zero crossing of the line voltage. When a positive zero crossing is detected (step 105), the program calls a first series of subroutines in sequence. These first subroutines relate to sensing the condition of the system and determining whether compressor motor 20 should be started. These subroutines include the cabinet thermostat subroutine shown in FIG. 7 (step 106), the motor temperature subroutine shown in FIG. 8 (step 107) and the user setting subroutine shown in FIG. 9 (step 108). Details of the respective subroutines will be given below. The cabinet thermostat subroutine initially determines whether compressor motor 20 should be started. The motor temperature subroutine then determines whether an overheat condition exists within compressor motor 20. Finally, the user setting subroutine adds an offset based on the setting of user setting circuit 52 to the cabinet thermostat reading to determine whether compressor motor 20 should be started.

After the first set of subroutines are completed, the main program sequence waits for a negative zero crossing of the line voltage and when the negative zero crossing is detected (step 109) calls a second series of subroutines. The second set of subroutines generally relate to the start and control of compressor motor 20. These subroutines include the motor control subroutine shown in FIG. 10 (step 110), which checks the status of the compressor motor and starts compressor motor 20 if necessary, the clock subroutine shown in FIG. 16 (step 111), which updates the system clock, and the frost timer subroutine shown in FIG. 17 (step 112), which determines whether the defrost function should be initiated. Details of these subroutines will be given below. Once these subroutines are completed, the main program sequence returns to step 102 and repeats the entire cycle.

Figure 7:
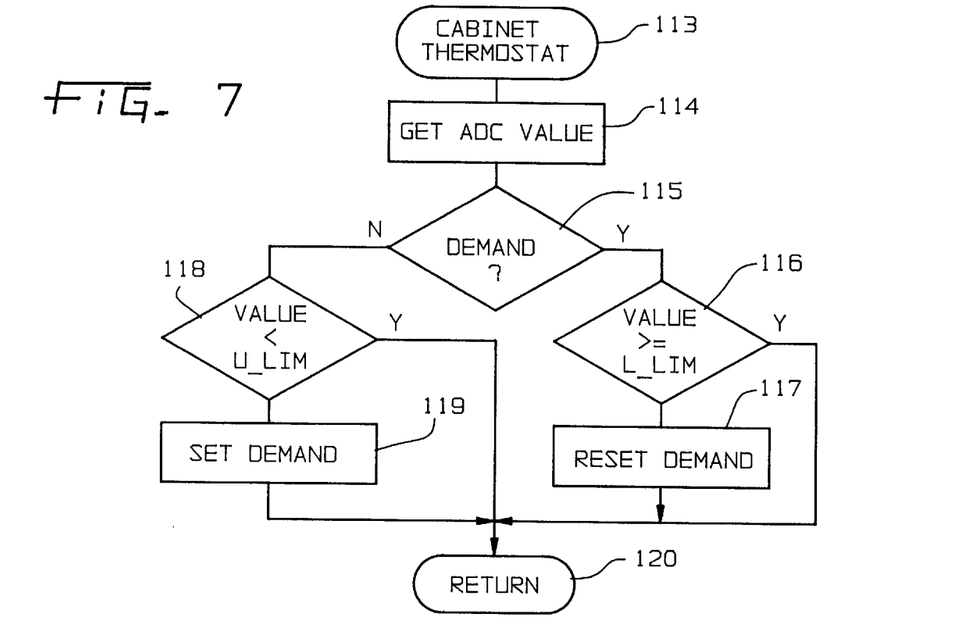
FIG. 7 is a flow chart of the cabinet thermostat check subroutine.

After the positive zero crossing of the line voltage is detected in step 105, the main program sequence calls the cabinet thermostat subroutine shown in FIG. 7 (step 106). The cabinet thermostat subroutine, which comprises steps 113–120, checks the cabinet temperature and sets the demand variable to start compressor motor 20 if the temperature indicates that cooling is necessary. The cabinet thermostat subroutine calls the cabinet temperature (step 114), determines whether the demand variable has previously been set (step 115), then compares the temperature with a predetermined upper temperature limit to set the demand variable (steps 118 and 119) or a lower temperature limit to reset the demand variable (steps 116 and 117). The subroutine returns to the main program sequence at step 120.

Figure 8:
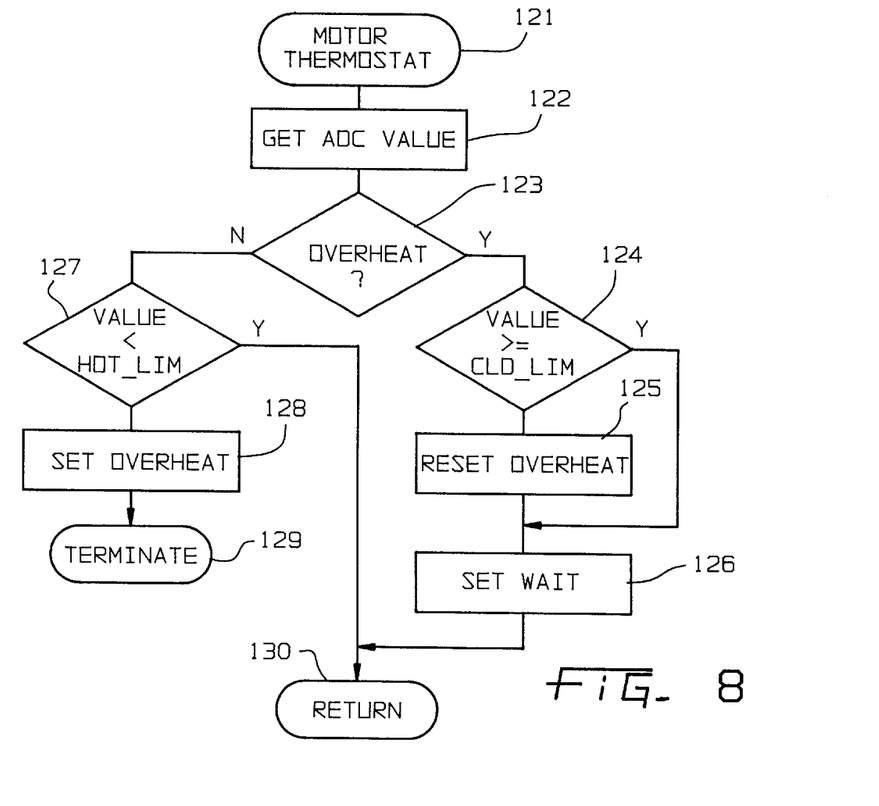
FIG. 8 is a flow chart of the motor thermostat check subroutine.

The main program sequence next calls the motor thermostat subroutine shown in FIG. 8 (step 107). The motor thermostat subroutine, which comprises steps 121–130, checks the compressor motor housing temperature and terminates compressor motor operations if a motor overheat condition is detected. The motor thermostat subroutine first calls the compressor motor housing temperature (step 122) then determines the status of the overheat variable (step 123). If the overheat variable is not set, but the compressor motor housing temperature is greater than an upper temperature limit, compressor motor operations is stopped by calling the terminate subroutine (steps 127, 128 and 129). If the overheat variable is set, the motor thermostat subroutine compares the temperature with a lower temperature limit and sets the wait variable as necessary in step 126, before returning to the main program sequence (step 124, 125, 126). The wait variable must be reset before the motor start subroutine can attempt a motor start sequence.

Figure 12:
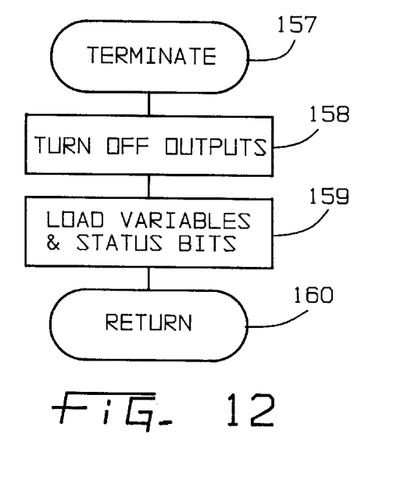
FIG. 12 is a flow chart of the terminate subroutine.

The terminate subroutine, which comprises steps 157–160 and is shown in FIG. 12, stops compressor motor operation and initializes the status variables. The terminate subroutine turns off the outputs to Triacs TR1 and TR3 in order to deenergize main winding 24 and auxiliary winding 22 (step 158) and reinitializes the variables and status bits (step 159) before returning to the main program sequence (step 160).

Figure 9:
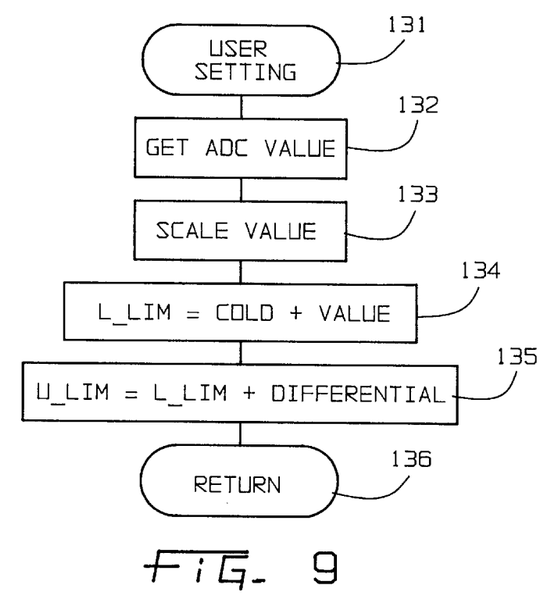
FIG. 9 is a flow chart of the user setting subroutine.

The main program sequence next calls the user setting subroutine shown in FIG. 9 (step 108). The user setting subroutine, which comprises steps 131–136, adjusts the upper and lower temperature range of the system based on the setting of user adjustment circuit 52. The user setting subroutine takes a value corresponding to the user adjust temperature setting (step 132), scales that value (step 133) and applies that scaled value as an offset to set new upper (step 134) and lower temperature (step 135) limits.

In the above three subroutines, the main program sequence determines whether the compressor motor should be started based on the chamber temperature, compressor motor housing temperature and user setting. Once the above three subroutines are completed, the main program sequence waits for a negative zero voltage crossing. When the negative zero voltage crossing is detected (step 109), the main program sequence calls a second series of subroutines which relate to the starting and control of compressor motor 20.

Figure 10:
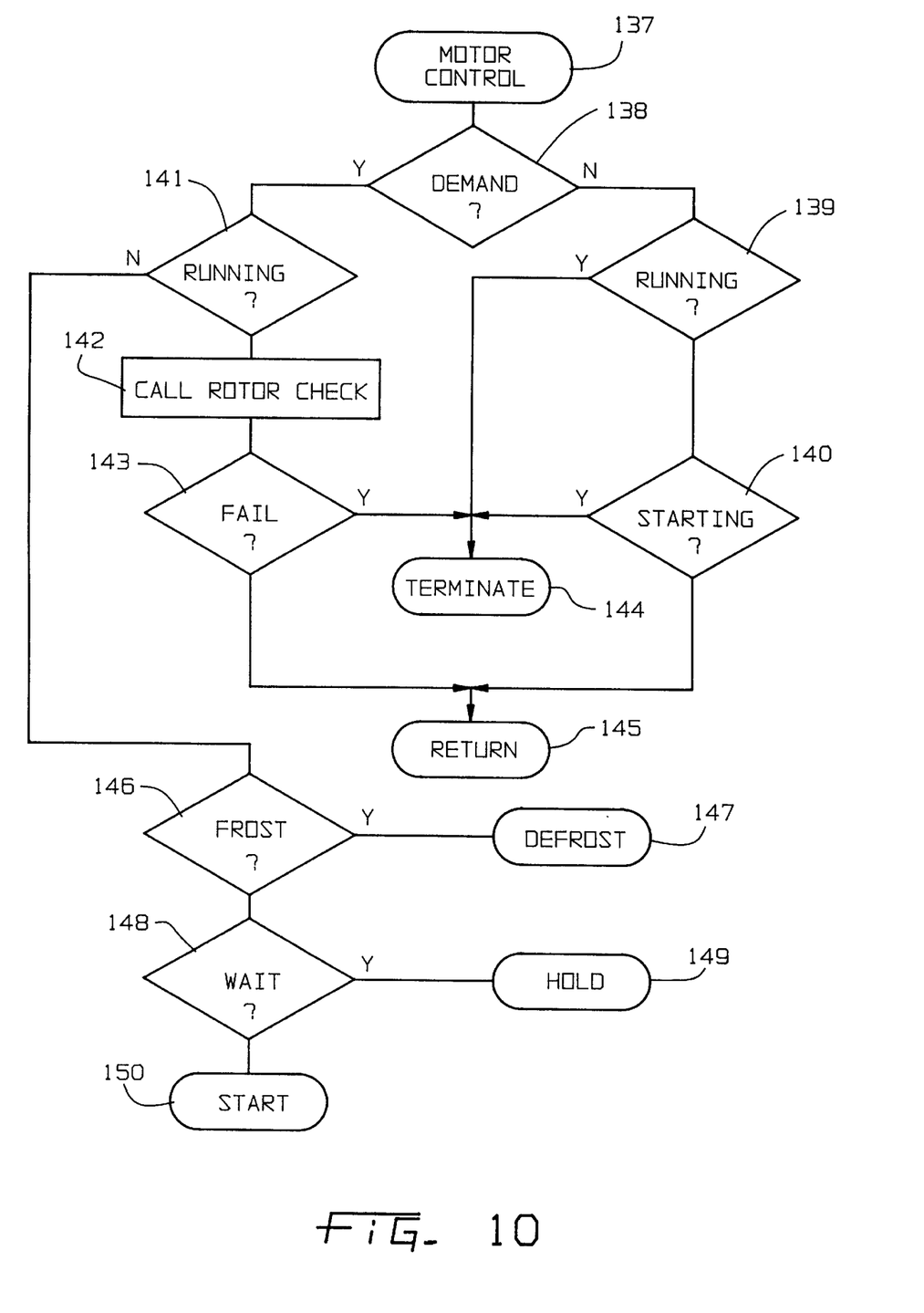
FIG. 10 is a flow chart of the motor control subroutine.

The main program sequence first calls the motor control subroutine shown in FIG. 10 (step 110). The motor control subroutine, which comprises steps 137–150, controls compressor motor 20 based on the status of compressor motor 20 and the demand variable. The motor control subroutine first checks the status of the demand variable (step 138). If the demand variable is not set, compressor motor 20 is not to be started and the motor control subroutine checks to see whether compressor motor 20 is running (step 139) or being started (step 140). If compressor motor 20 is running or being started, the motor control subroutine de-energizes compressor motor 20 by calling the terminate subroutine (step 144), otherwise the motor control subroutine returns to the main program sequence (step 145).

If the demand variable is set, compressor motor 20 is to be started and the motor control subroutine determines whether compressor motor 20 is running (step 141). If compressor motor 20 is running, the motor control subroutine checks the status of compressor motor 20 by calling the rotor check subroutine shown in FIG. 11 (step 142) and determining the status of the fail variable (step 143). The fail variable is set when the rotor check subroutine determines that a locked rotor condition exists. If the fail variable is set, the motor control subroutine calls the terminate subroutine (step 144), otherwise the motor control subroutine returns to the main program sequence (step 145).

If compressor motor 20 is not running, the motor control subroutine program determines whether the frost variable (step 146) or the wait variable is set (step 148). If either variable is set, the motor control subroutine calls the respective subroutine (steps 147 and 149) and waits until that subroutine completed before calling the start subroutine to start the compressor motor (step 150). The details of the defrost subroutine and the hold subroutine will be discussed below.

Figure 15:
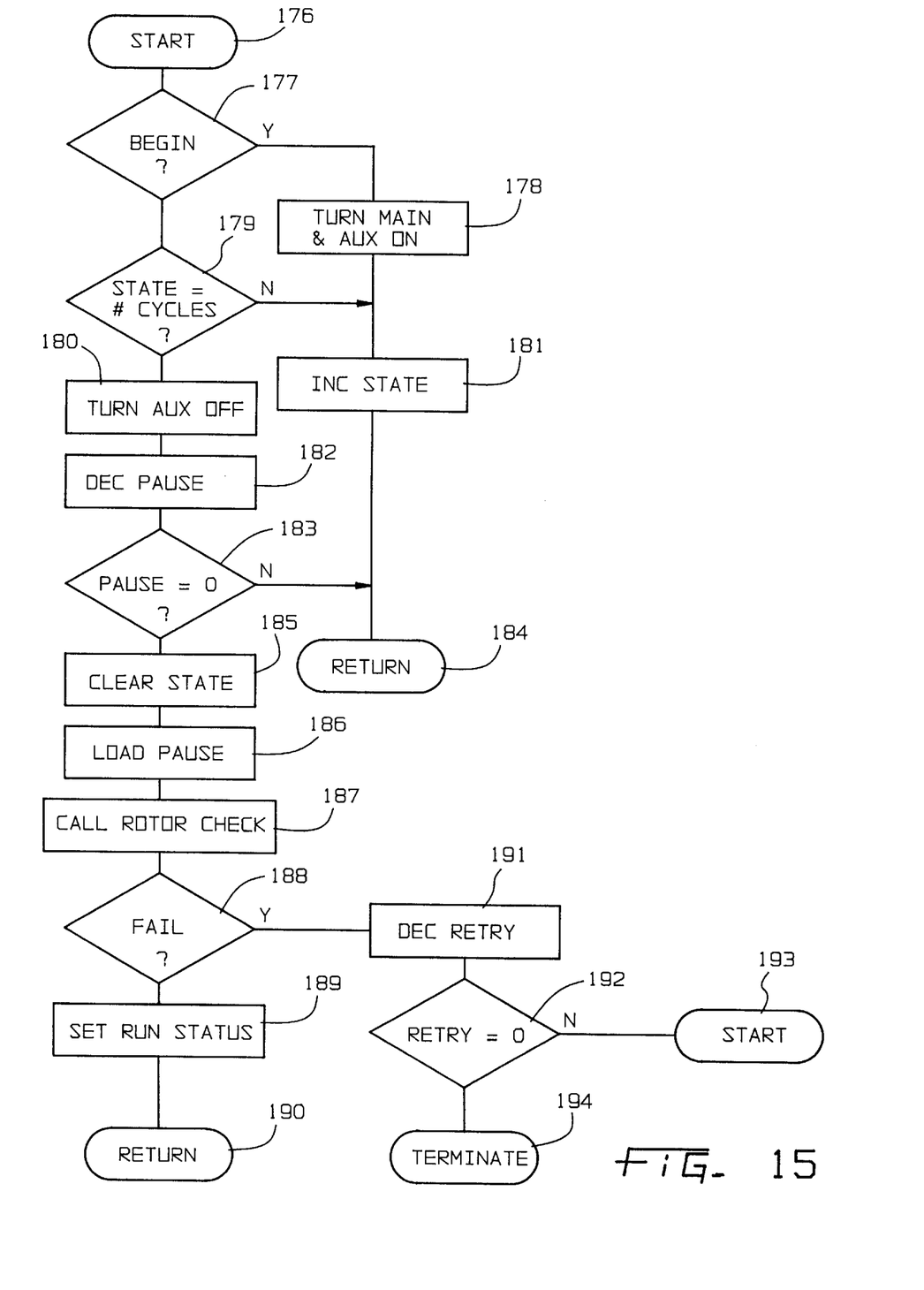
FIG. 15 is a flow chart of the motor start subroutine.

The start subroutine, which comprises steps 176–194, is shown in FIG. 15. The start subroutine first determines whether a motor start sequence is to begin (step 177). If a motor start sequence is to begin, the start subroutine starts compressor motor 20 by energizing main winding 24 and auxiliary winding 22 (step 178) then waiting for a predetermined period of time (step 179) before de-energizing auxiliary winding 22 (step 180). After auxiliary winding 22 has been de-energized, the start subroutine again waits for a predetermined period of time (steps 182 and 183) before checking the movement status of rotor 21 by calling the rotor check subroutine (step 187) and checking the status of the fail variable (step 188).

Figure 11:
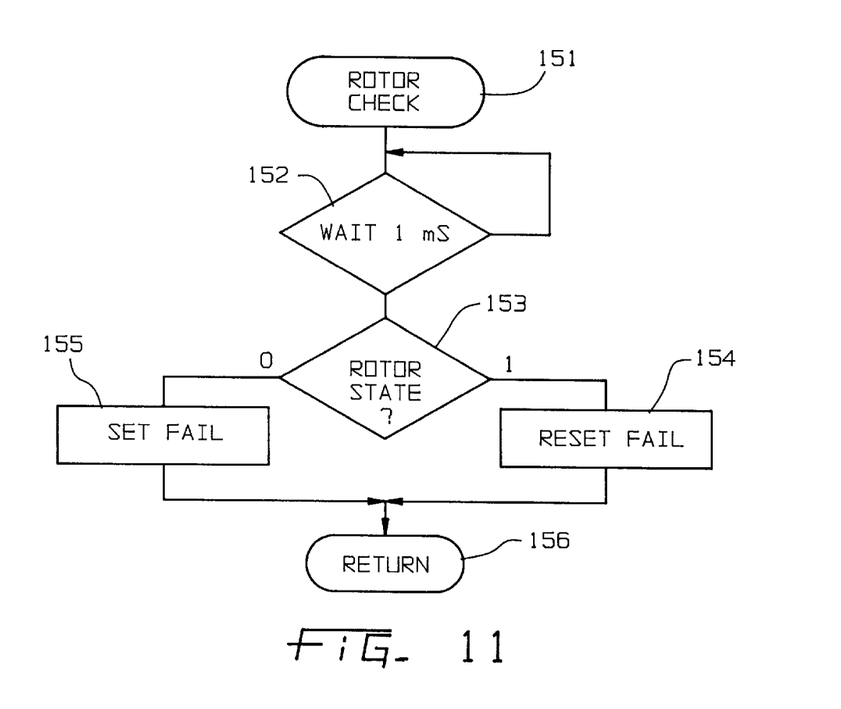
FIG. 11 is a flow chart of the rotor check subroutine.

Rotor check subroutine, which comprises steps 151–156 and is shown in FIG. 11, checks the movement status of rotor 21 and sets the fail variable (step 155) if a locked rotor condition is detected. The rotor check subroutine waits for a predetermined time period, such as 1 millisecond in the exemplary embodiment (step 152), before determining whether rotor 21 is sufficiently up to speed (step 153). Rotor check subroutine determines status of rotor 21, by checking the phase difference between the line voltage and the voltage between main winding 24 and auxiliary winding 22, sets (step 155) or resets (step 154) the fail variable, then returns to the start subroutine (step 156).

In the first embodiment, microprocessor 65 determines the status of rotor 21 by checking the logic state of input PB7 which corresponds to the voltage between main winding 24 and auxiliary winding 22. After waiting for a predetermined period of time after the zero crossing of the line voltage as indicated on input PB6, microprocessor 65 checks the status of input PB7. If the voltage between main winding 24 and auxiliary winding 22 exceeds a predetermined level, a small phase difference exists and the logic state of input PB7 indicates a locked rotor condition. If the voltage between main winding 24 and auxiliary winding 22 is less than the predetermined level, sufficient phase difference exists and the logic state of input PB7 indicates rotor 21 is running.

In an alternative embodiment, microprocessor 65 determines the status of rotor 21 by determining the elapsed time between the zero crossing of the line voltage and the zero crossing of the voltage between the main winding 24 and auxiliary winding 22. If the elapsed time exceed a predetermined amount, sufficient phase difference exists and microprocessor 65 detects a moving rotor 21. If the elapsed time is less than the predetermined amount, the phase difference is small and microprocessor 65 detects a locked rotor 21.

In the start subroutine shown in FIG. 15, if the microprocessor detects a locked rotor condition as indicated by the fail variable (step 188), the start subroutine attempts a limited number of restarts (steps 191–194) before terminating the start operation (step 194). The limited restart function is implemented by a retry variable, which is initially set to a predetermined value in the main program sequence and decremented after each start attempt (step 191). A restart attempt is permitted as long as the retry variable is greater than zero (step 192). If the retry variable reaches zero, the start subroutine calls the terminate subroutine (step 194) to terminate the start operation.

If the fail variable is not set, the program detects a normal start (step 188) and sets the run variable (step 189) to indicate that compressor motor 20 is running normally and returns to the main program sequence (step 190).

The main program sequence then calls the clock subroutine shown in FIG. 16 (step 111). The clock subroutine, which comprises steps 195–206, updates the system clock. A timer function is required during defrost operations and while the compressor motor is running to coordinate system operations, thus the clock checks to ensure that those conditions are present (steps 196 and 197). The tic variable is checked to ensure that the tic variable has been reset before the system clock is updated (step 197). The clock subroutine increments the system clock by one second (steps 199–205) and returns to the main program sequence (step 206).

Figure 17:
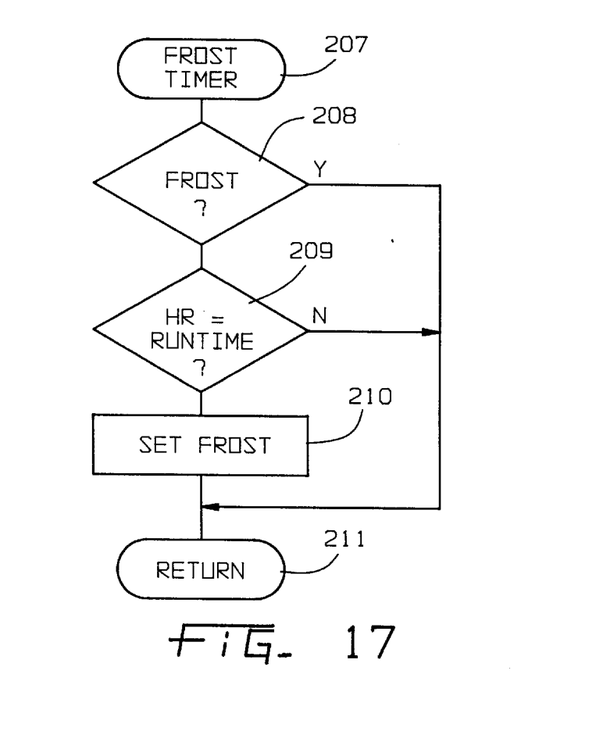
FIG. 17 is a flow chart of the frost timer subroutine.

The main program sequence then calls the frost timer subroutine shown in FIG. 17 (step 112). The frost timer subroutine, which comprises steps 207–211, determines whether a defrost operation is required. The system automatically initiates a defrost operation after a predetermined runtime has elapsed (steps 209 and 210). The frost timer subroutine initiates the defrost operation by setting the frost variable (step 210). However, the actual defrosting commences when the motor control subroutine calls the defrost subroutine (step 147).

Figure 13:
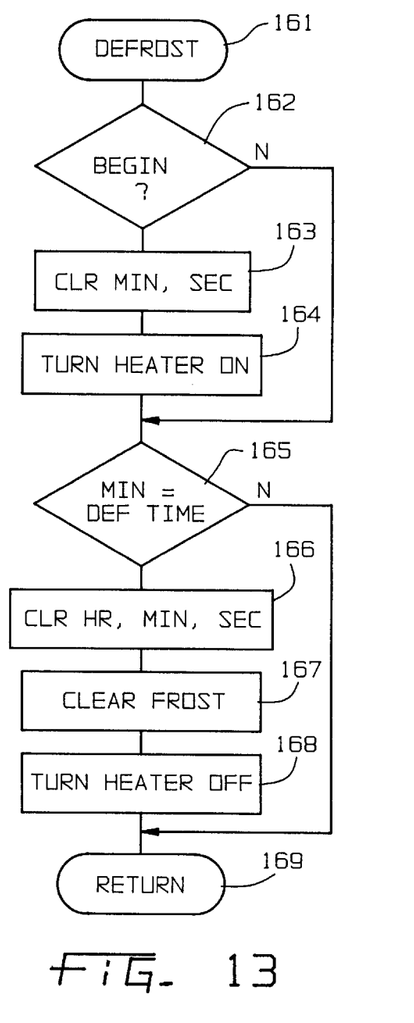
FIG. 13 is a flow chart of the defrost subroutine.

The defrost subroutine, which comprises steps 168–176, controls the defrost operation and is shown in FIG. 13. If the defrost operation is to be started (step 162), the defrost subroutine initializes a timer (step 163) and energizes defrost heater 58 (step 164). The defrost subroutine then determines whether defrost operation is complete (step 165). If defrost heater 58 has been energized for a sufficient period of time, the defrost subroutine stops the defrost operation by resetting the timer (step 166) and frost variable (step 167), de-energizing defrost heater 58 (step 168) and returning to the main program sequence (step 169). If the defrost operation is not complete, the defrost subroutine continues running the timer and defrost heater 58 and returns to the main program sequence (steps 165 and 169).

Figure 14:
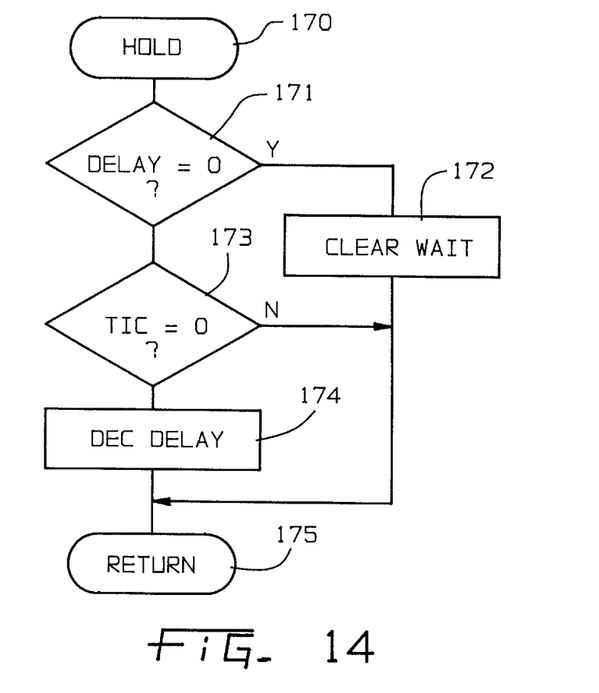
FIG. 14 is a flow chart of the hold subroutine.

The hold subroutine forces the motor start subroutine to wait for a predetermined amount of time, if the wait variable is set, before a motor start sequence can be attempted. The hold subroutine, which comprises steps 170–175, is shown in FIG. 14. The hold subroutine decrements the delay variable (step 174), which is initially set at the beginning of the main program sequence, each time the tic variable reaches zero (step 173). When the delay variable reaches zero (step 171), the wait variable is cleared (step 172) and the motor start subroutine can attempt a motor start sequence.

Microprocessor 65 continually sequences through the main program sequence and calls the respective subroutines as necessary. Thus, control system 1 continually monitors and controls the system in order to start compressor motor 20 as necessary and monitor its performance during normal operations. As noted above, adding additional features to control system 1 is simply a matter of reprogramming microprocessor 65 and adding the required system components and inputs. Some additional features include, but are not limited to, fan control, adaptive defrost, demand defrost, alarms, temperature displays, etc.

Although the status of the system has been described as being determined with a number of status variables, which may be stored in memory storage devices located either on or off microprocessor 65, it is to be understood that the status of the various system elements can also be determined by status input lines hardwired directly into microprocessor 65.

The present invention maybe practiced by using the following values for the circuit elements described above:

| Label | Value |
|---|---|
| F1 | 0.5 A,250 V |
| MOV1 | V140LA5 |
| D1 | 1N4735 |
| D2 | 1N4004 |
| D3 | 1N4148 |
| C1 | 1 uF, 250 V |
| C2 | 220 uF, 10 V |
| C3 | 0.1 uF |
| C4 | 0.1 uF |
| Y1 | 8MHz Ceramic Resonator |
| U1 | ST6210 microcontroller (2K memory, A/D converters, timers |
| R1 | 1M Ohm |
| R3 | 1M Ohm |
| R4 | 390 Ohm |
| R5 | 390 Ohm |
| R6 | 390 Ohm |
| R7 | 390 Ohm |
| R8 | 10K Ohm |
| R9 | 10K Ohm |
| R10 | 10K Ohm |
| R11 | 5 Ohm, 10W |
| R12 | NTC Thermistor |
| R13 | 10K Ohm potentiometer |
| R14 | NTC Thermistor |
| TR1 | MAC15 |
| TR2 | MAC228 |
| TR3 | MAC15 |
| TR4 | 2N6075 |

While this invention has been described as having an exemplary design, the present invention may be further modified within the spirit and scope of this disclosure. For example, the signals generated by the circuitry of the present invention may take many forms, such as voltage levels, logic levels, polarity, current levels, etc. This application is therefore intended to cover any variations, uses, or adaptations of the invention using its general principles. Further, this application is intended to cover such departures from the present disclosure as come within known or customary practice in the art to which this invention pertains.

What is claimed is:

1. A control circuit for a motor having a main winding and an auxiliary winding, said control circuit comprising:
   connecting means for selectively connecting a line voltage to the main winding and the auxiliary winding;
   microprocessor means coupled to said connecting means, said microprocessor means including means to activate said connecting means to selectively energize the main winding and the auxiliary winding, said microprocessor means including means for determining the phase difference between the line voltage and the voltage between the main winding and the auxiliary winding by detecting zero crossings of the line voltage and zero crossings of the voltage between the main winding and the auxiliary winding, said microprocessor means including means for de-energizing the motor when said phase difference indicates a motor fault condition.

2. The control circuit of claim 1 wherein said connecting means includes a plurality of solid state switches.

3. The control circuit of claim 1 wherein said microprocessor means determines the phase difference by sensing a logic state of the voltage between the main winding and the auxiliary winding after a predetermined time period has elapsed after said microprocessor means detects a zero crossing of the line voltage.

4. The control circuit of claim 3 wherein said predetermined time period is about 1 millisecond.

5. The control circuit of claim 1 wherein said microprocessor means determines said phase difference by measuring the time delay between a zero crossing of the line voltage and the first zero crossing of the voltage between the main winding and the auxiliary winding that follows said zero crossing of the line voltage.

6. A control circuit for a motor having a main winding and an auxiliary winding, said control circuit comprising:
   a plurality of solid state switches for selectively connecting a line voltage to the main winding and the auxiliary winding;
   a microprocessor coupled to said plurality of solid state switches, said microprocessor controlling said plurality of solid state switches to selectively energize the main winding and the auxiliary winding, said microprocessor including first instructions that enable said microprocessor to determine the phase difference between the line voltage and the voltage between the main winding and the auxiliary winding by detecting zero crossings of the line voltage and zero crossings of the voltage between the main winding and the auxiliary winding, said microprocessor including second instructions that enable said microprocessor to de-energize the motor when said phase difference indicates a motor fault condition.

7. The control circuit of claim 6 wherein said microprocessor determines the phase difference by sensing a logic state of the voltage between the main winding and the auxiliary winding after a predetermined time period has elapsed after said microprocessor detects a zero crossing of the line voltage.

8. The control circuit of claim 7 wherein said predetermined time period is about 1 millisecond.

9. The control circuit of claim 6 wherein said microprocessor determines the phase difference by measuring the time delay between a zero crossing of the line voltage and the first zero crossing of the voltage between the main winding and the auxiliary winding after the zero crossing of the line voltage.

10. An apparatus comprising:
    a motor having a main winding and an auxiliary winding;
    connecting means for selectively connecting a line voltage to said main winding and said auxiliary winding;
    microprocessor means coupled to said connecting means, said microprocessor means controlling said connecting means to activate said connecting means to selectively energize said main winding and said auxiliary winding, said microprocessor means including means for determining a phase difference between the line voltage and the voltage between said main winding and said auxiliary winding by detecting zero crossings of the line voltage and zero crossings of the voltage between said main winding and said auxiliary winding, said microprocessor means including means for de-energizing said motor when said phase difference indicates a motor fault condition.

11. The apparatus of claim 10 wherein said connecting means includes a plurality of solid state switches.

12. The apparatus of claim 10 wherein said microprocessor means determines said phase difference by sensing a logic state of the voltage between said main winding and said auxiliary winding after a predetermined time period has elapsed after said microprocessor means detects a zero crossing of the line voltage.

13. The apparatus of claim 12 wherein said predetermined time period is about 1 millisecond.

14. An apparatus of claim 10 wherein said microprocessor determines said phase difference by measuring the time delay between a zero crossing of the line voltage and the first zero crossing of the voltage between said main winding and said auxiliary winding after said zero crossing of the line voltage.

15. An apparatus comprising:
   a motor having a main winding and an auxiliary winding;
   a plurality of solid state switches for selectively connecting a line voltage to said main winding and said auxiliary winding;
   a microprocessor coupled to said motor and said plurality of solid state switches, said microprocessor controlling said plurality of solid state switches to activate said plurality of solid state switches to selectively energize said main winding and said auxiliary winding, said microprocessor including first instructions that enable said microprocessor to determine a phase difference between the line voltage and the voltage between said main winding and said auxiliary winding by detecting zero crossings of the line voltage and zero crossings of the voltage between said main winding and said auxiliary winding, said microprocessor including second instructions that enable said microprocessor de-energize said motor when said phase difference is less than a predetermined limit.

16. The apparatus of claim 15 wherein said first instructions enable said microprocessor to determine said phase difference by sensing a logic state of the voltage between said main winding and said auxiliary winding after a predetermined time period has elapsed after said microprocessor detects a zero crossing of the line voltage.

17. The apparatus of claim 16 wherein said predetermined time period is about 1 millisecond.

18. The apparatus of claim 16 wherein said motor is a single phase AC induction motor having a stator, and said main winding and said auxiliary winding are disposed electrically out of phase on said stator.

19. The apparatus of claim 15 wherein said first instructions enable said microprocessor to determine said phase difference by measuring the time delay between a zero crossing of the line voltage and the first zero crossing of the voltage between said main winding and said auxiliary winding after said zero crossing of the line voltage.

20. The apparatus of claim 19 wherein said motor is a single phase AC induction motor having a stator, and said main winding and said auxiliary winding are disposed electrically out of phase on said stator.

21. A refrigeration system for cooling a chamber, comprising:
   a thermostat disposed in thermal contact with said chamber;
   a compressor having a motor with a main winding and an auxiliary winding;
   connecting means for selectively connecting a line voltage to said main winding and said auxiliary winding;
   microprocessor means coupled to said thermostat, said motor and said connecting means, said microprocessor means controlling said connecting means to activate said connecting means to selectively energize said main winding and said auxiliary winding, said microprocessor means including means for determining a phase difference between the line voltage and the voltage between said main winding and said auxiliary winding by detecting zero crossings of said line voltage and zero crossings of the voltage between said main winding and said auxiliary winding, said microprocessor means including means for de-energizing said motor when said phase difference is less than a predetermined limit, said microprocessor means including means for energizing and de-energizing said motor based on temperatures sensed by said thermostat.

22. The refrigeration system of claim 21 further comprising a housing enclosing said motor;
   a second thermostat disposed in thermal contact with said housing;
   said microprocessor means further coupled to said second thermostat, said microprocessor means further including means for preventing a start of said motor and de-energizing said motor when said second thermostat indicates a temperature above a predetermined limit.

23. The refrigeration system of claim 21 further comprising a manually set user setting device;
   said microprocessor means further coupled to said user setting device, said microprocessor means further including means for energizing and de-energizing said motor based on temperatures sensed by said thermostat and adjusted by said user setting.

24. The refrigeration system of claim 21 wherein said connecting means includes a plurality of solid state switches.

25. The refrigeration system of claim 21 wherein said microprocessor means determines said phase difference by sensing a logic state of said voltage between said main and said auxiliary windings after a predetermined time period has elapsed after said microprocessor means detects a zero crossing of the line voltage.

26. The refrigeration system of claim 25 wherein said predetermined time period is about 1 millisecond.

27. The refrigeration system of claim 26 wherein said motor is a single phase AC induction motor having a stator and said main winding and said auxiliary winding are disposed electrically out of phase with each other on said stator.

28. The refrigeration system of claim 21 wherein said microprocessor means determines said phase difference by measuring the time delay between a zero crossing of the line voltage and the first zero crossing of the voltage between said main winding and said auxiliary winding after said zero crossing of the line voltage.

29. The refrigeration system of claim 28 wherein said motor is a single phase AC induction motor having a stator, and said main winding and said auxiliary winding are disposed electrically out of phase with each other on said stator.

30. A refrigeration system for cooling a chamber, comprising:
   a thermostat disposed in thermal contact with said chamber;
   a compressor having a motor with a main winding and an auxiliary winding;
   a plurality of solid state switches for selectively connecting a line voltage to said main winding and said auxiliary winding;
   a microprocessor coupled to said thermostat, said motor and said plurality of solid state switches, said microprocessor controlling said plurality of solid state switches to activate said plurality of solid state switches to selectively energize said main winding and said auxiliary winding, said microprocessor including first instructions for determining a phase difference between the line voltage and the voltage between said main winding and said auxiliary winding by detecting zero crossings of said line voltage and zero crossings of the voltage between said main winding and said auxiliary winding, said microprocessor including second instructions for de-energizing said motor when said phase difference is less than a predetermined limit, said microprocessor including third instructions for energizing and de-energizing said motor based on temperatures sensed by said thermostat.

31. The refrigeration system of claim 30 further comprising a housing enclosing said motor;

a second thermostat disposed in thermal contact with said housing;

said microprocessor further coupled to said second thermostat, said microprocessor further including fourth instructions for preventing a start of said motor and de-energizing said motor when said second thermostat indicates a temperature above a predetermined limit.

32. The refrigeration system of claim 30 further comprising a manually set user setting device;

said microprocessor further coupled to said user setting device, said microprocessor further including fifth instructions for energizing and de-energizing said motor based on temperatures sensed by said thermostat and adjusted by said user setting.

33. The refrigeration system of claim 30 wherein said microprocessor determines said phase difference by sensing a logic state of said voltage between said main and said auxiliary windings after a predetermined time period has elapsed after said microprocessor detects a zero crossing of the line voltage.

34. The refrigeration system of claim 33 wherein said predetermined time period is about 1 millisecond.

35. The refrigeration system of claim 34 wherein said motor is a single phase AC induction motor having a stator and said main winding and said auxiliary winding are disposed electrically out of phase with each other on said stator.

36. The refrigeration system of claim 30 wherein said microprocessor determines said phase difference by measuring the time delay between a zero crossing of the line voltage and the first zero crossing of the voltage between said main winding and said auxiliary winding after said zero crossing of the line voltage.

37. The refrigeration system of claim 30 wherein said motor is a single phase AC induction motor having a stator, and said main winding and said auxiliary winding are disposed electrically out of phase with each other on said stator.

* * * * *